US008145622B2

(12) United States Patent
Yin et al.

(10) Patent No.: US 8,145,622 B2
(45) Date of Patent: Mar. 27, 2012

(54) SYSTEM FOR FINDING QUERIES AIMING AT TAIL URLS

(75) Inventors: Xiaoxin Yin, Bothell, WA (US); Vijay Ravindran Nair, Redmond, WA (US); Ryan Frederick Stewart, Snoqualmie, WA (US); Fang Liu, Bellevue, WA (US); Junhua Wang, Sammamish, WA (US); Tiffany Kumi Dohzen, Seattle, WA (US); Yi-Min Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 12/351,013

(22) Filed: Jan. 9, 2009

(65) Prior Publication Data

US 2010/0179929 A1 Jul. 15, 2010

(51) Int. Cl.
*G06F 7/00* (2006.01)

(52) U.S. Cl. ........................................ 707/713; 707/714

(58) Field of Classification Search .................. 707/104, 707/713, 709, 705, 5, 2, 708, 71; 706/14, 706/12

See application file for complete search history.

(56) References Cited

U.S. PATENT DOCUMENTS 6,073,091 A * 6/2000 Kanevsky et al. ................ 704/9
6,418,432 B1 * 7/2002 Cohen et al. .......................... 1/1
7,136,845 B2 11/2006 Chandrasekar
7,272,594 B1 * 9/2007 Lynch et al. .......................... 1/1
7,426,497 B2 * 9/2008 Bacioiu et al. .................. 706/12
7,464,071 B2 * 12/2008 Galindo-Legaria et al. .......... 1/1
7,672,943 B2 * 3/2010 Wong et al. ................... 707/709
7,752,220 B2 * 7/2010 Weyand et al. ............... 707/767
7,797,302 B2 * 9/2010 Kenedy et al. ................ 707/708
7,836,044 B2 * 11/2010 Kamvar et al. ............... 707/713
7,899,807 B2 * 3/2011 Olston et al. .................. 707/709
7,908,234 B2 * 3/2011 Shao et al. ...................... 706/21

(Continued)

FOREIGN PATENT DOCUMENTS

WO WO 2007/048432 * 5/2007

OTHER PUBLICATIONS

Dough Downey, et al., Heads and Tails: Studies of Web Search with Common and Rare Queries http://research.microsoft.com/~horvitz/heads_and_tails_SIGIR.pdf. Last accessed on Nov. 17, 2008, 2 pages.

(Continued)

*Primary Examiner* — James Trujillo
*Assistant Examiner* — Thong Vu
(74) *Attorney, Agent, or Firm* — Lee & Hayes, PLLC

(57) ABSTRACT

Systems and methodologies for improved query classification and processing are provided herein. As described herein, a query prediction model can be constructed from a set of training data (e.g., diagnostic data obtained from an automatic diagnostic system and/or other suitable data) using a machine learning-based technique. Subsequently upon receiving a query, a set of features corresponding to the query, such as the length and/or frequency of the query, unigram probabilities of respective words and/or groups of words in the query, presence of pre-designated words or phrases in the query, or the like, can be generated. The generated features can then be analyzed in combination with the query prediction model to classify the query by predicting whether the query is aimed at a head Uniform Resource Locator (URL) or a tail URL. Based on this prediction, an appropriate index or combination of indexes can be assigned to answer the query.

20 Claims, 10 Drawing Sheets

100
QUERY 110
QUERY CLASSIFIER COMPONENT 120
FEATURE GENERATION COMPONENT 122
MODEL BUILDING COMPONENT 124
PREDICTING COMPONENT 126
INDEX 1 $130_1$
INDEX N $130_N$

U.S. PATENT DOCUMENTS

| | | | | |
|---|---|---|---|---|
| 2004/0181525 | A1* | 9/2004 | Itzhak et al. | 707/5 |
| 2006/0085399 | A1 | 4/2006 | Carmel | |
| 2007/0005646 | A1* | 1/2007 | Dumais et al. | 707/104.1 |
| 2007/0214131 | A1 | 9/2007 | Cucerzan | |
| 2008/0183685 | A1 | 7/2008 | He | |
| 2009/0157666 | A1* | 6/2009 | Gehrke et al. | 707/5 |
| 2009/0187516 | A1* | 7/2009 | Kanungo et al. | 706/12 |
| 2009/0187540 | A1* | 7/2009 | Richardson et al. | 707/3 |
| 2009/0234784 | A1* | 9/2009 | Buriano et al. | 706/12 |
| 2010/0049678 | A1* | 2/2010 | Huang et al. | 706/14 |
| 2010/0082507 | A1* | 4/2010 | Ganapathi et al. | 706/12 |
| 2010/0161591 | A1* | 6/2010 | Jones et al. | 707/722 |

OTHER PUBLICATIONS

Thomas Hofmann, Probabilistic Latent Semantic Indexing http://www.cs.brown.edu/~th/papers/Hofmann-SIGIR99.pdf. Last accessed on Nov. 17, 2008, 8 pages.

Ronny Lempel, et al., Predictive Caching and Prefetching of Query Results in Search Engines http://www2003.org/cdrom/papers/refereed/p017/p17-lempel.html. Last accessed on Nov. 17, 2008, 18 pages.

The Long Tail and Short Head of Search http://www.searchtools.com/analysis/long-tail.html. Last accessed on Nov. 18, 2008, 4 pages.

Andrei Border, et al., Robust Classification of Rare Queries using Web Knowledge http://www-cs-students.stanford.edu/~amrutaj/work/papers/qclass.pdf. Last accessed on Nov. 17, 2008, 8 pages.

Steven M. Beitzel, et al., Improving Automatic Query Classification via Semi-Supervised Learning http://www.ir.iit.edu/~abdur/publications/beitzels-Classification.pdf. Last accessed on Nov. 17, 2008, 8 pages.

Ryen W. White, et al.,Enhancing Web Search by Promoting Multiple Search Engine Use http://research.microsoft.com/~ryenw/papers/WhiteSIGIR2008a.pdf. Last accessed on Nov. 18, 2008, 8 pages.

* cited by examiner

SYSTEM FOR FINDING QUERIES AIMING AT TAIL URLS

BACKGROUND

As the use of computing devices and networks such as the Internet that connect computing devices has increased, there has been a rapid increase in the number of pages on the World Wide Web. Because of the large and growing number of available web pages, it is currently difficult for a search engine to place all available web pages into a single, high-speed index. Instead, search engines often use multiple indexes, including one or more indexes with smaller capacity but higher speed and one or more indexes with larger capacity but lower speed. Alternatively, some existing search engines utilize a single index and provide varying levels of priority and/or optimization based on various factors relating to received queries.

Conventionally, smaller, faster indexes used by a search engine contain head Uniform Resource Locators (URLs), e.g. URLs searched by many users, while larger, slower indexes contain tail URLs, e.g., URLs searched by fewer people. In order to maintain a trade-off between quality and speed, search engines traditionally skip using larger indexes when a sufficient amount of URLs that are responsive to a user's query can be found in smaller indexes. In order to ensure optimal performance of a search engine, a search engine can utilize mechanisms to ensure that the quality/speed trade-off incurred in processing a query results in an optimal user experience. For example, a user can experience dissatisfaction with a search engine if the most desirable URL for the user's query is located in a larger index but the larger index is skipped by the search engine. Similarly, however, if a search engine utilizes a larger index for every user query, the search engine will perform as slow as the larger index.

Conventional techniques for determining whether a larger, slower index is to be processed or skipped for a given user query generally rely on sets of rules that are manually written and applied to the search engine. However, rigid application of such rules can result in search engine performance that is not optimal for all cases and/or provides limited adaptability for changing network and/or hardware conditions. Accordingly, there is a need in the art for techniques for query classification and processing that mitigate at least the above shortcomings.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies are provided herein that facilitate improved query classification and processing. In accordance with one aspect, techniques are described herein that can be utilized to predict whether a query is targeted on a head URL or a tail URL, based on which various determinations can be performed to enhance processing of the query. For example, it can be determined whether a query would be better served by searching both a smaller and a larger index (e.g., due to the query being targeted on a tail URL) or by searching a smaller index only (e.g. due to the query being targeted on a head URL). As another example, a query can be prioritized based on whether it is targeted on a head URL or a tail URL such that, for example, a higher priority is given to queries found to be aimed at tail URLs. In one example, various query classification techniques described herein can be utilized independently of and/or in combination with conventional query operations such as query expansion, alteration, or correction. Further, it can be appreciated that the various aspects described herein could be utilized by both large, general search engines, and small, specific search engines.

In another example, respective queries can be classified using a machine learning-based technique. More particularly, when a query is received, a set of features that are relevant to a determination of whether the query is aimed at a tail URL can be generated. These features can include, for example, the length and/or frequency of the query, unigram probabilities of respective words and/or groups of words in the query, presence of pre-designated words or phrases in the query, or the like. Features generated for a query can then be provided to a prediction model in order to classify the query by predicting whether the query is aimed at a head URL or a tail URL. Based on the results of this prediction, the query can subsequently be processed using an appropriate index or combination of indexes.

In accordance with another aspect, a prediction model used for classifying queries as described herein can be built and/or refined using one or more machine learning techniques (e.g., decision trees, naïve Bayes classifiers, neural networks, etc.) based on a set of training data. In one example, training data utilized for building and/or maintaining a prediction model can include data relating to successful and/or unsuccessful queries obtained from a query diagnostic system.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
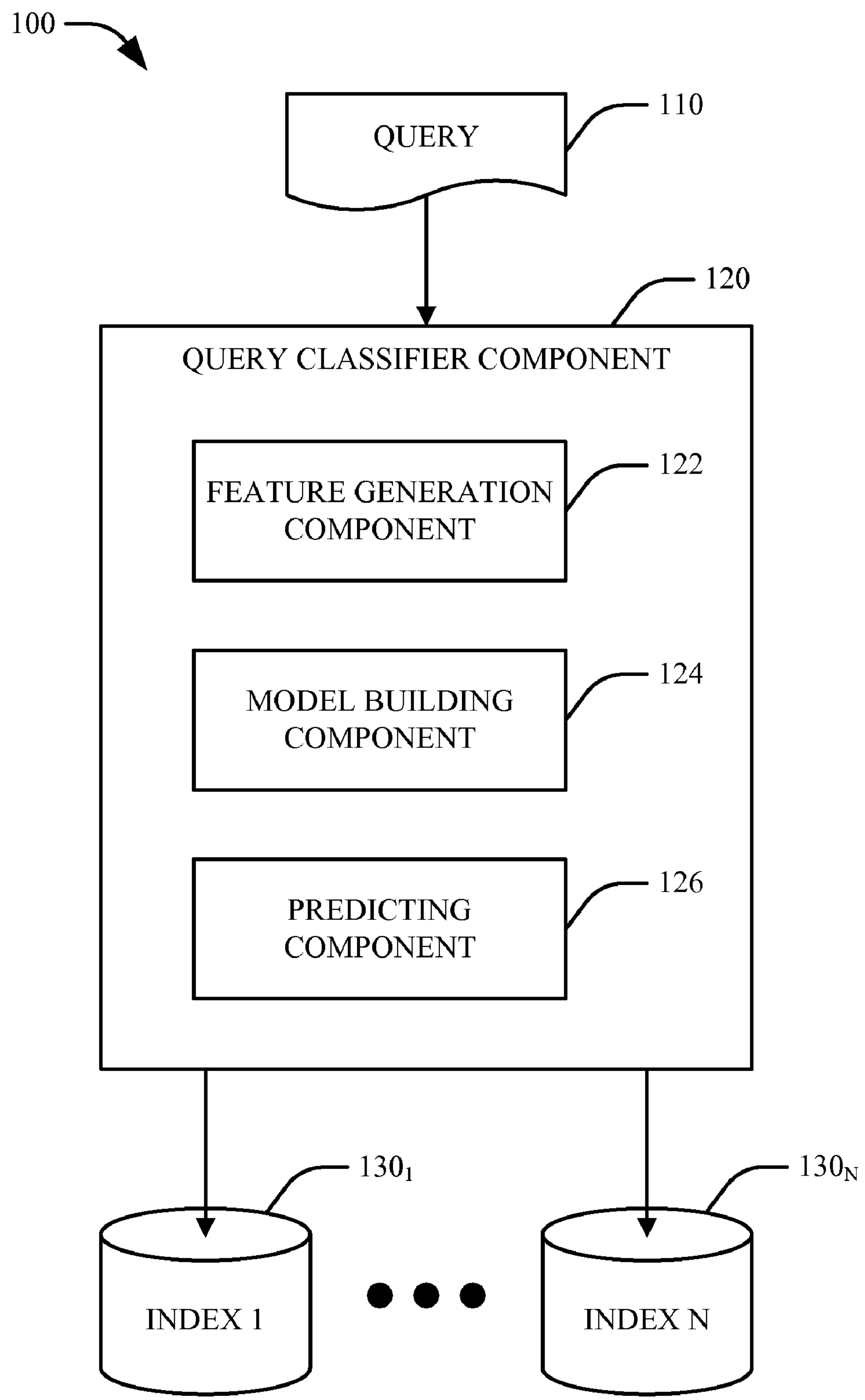
FIG. 1 is a high-level block diagram of a system for classifying a query in accordance with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms “component,” “module,” “system,” “interface,” “schema,” “algorithm,” or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term “article of manufacture” as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word “exemplary” is used herein to mean serving as an example, instance, or illustration. Any aspect or design described herein as “exemplary” is not necessarily to be construed as preferred or advantageous over other aspects or designs. Rather, use of the word exemplary is intended to present concepts in a concrete fashion. As used in this application, the term “or” is intended to mean an inclusive “or” rather than an exclusive “or.” That is, unless specified otherwise, or clear from context, “X employs A or B” is intended to mean any of the natural inclusive permutations. That is, if X employs A, X employs B, or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

Referring now to the drawings, FIG. 1 illustrates a block diagram of a system 100 for classifying a query 110 in accordance with various aspects described herein. In an example as illustrated by system 100, a query 110 can be provided to a query classifier component 120, which can process the query to predict whether the query is aimed at a common resource indexed by system 100 (e.g., a head URL) or an uncommon resource indexed by system 100 (e.g., a tail URL). In one example, this prediction can be used to determine one or more indexes 130 to be utilized in responding to the query. In accordance with one aspect, system 100 can be utilized in the context of a search engine, wherein a query 110 can be a search query provided by a user of the search engine and one or more indexes 130 can respectively represent sets of resources (e.g. processed web pages) that are searchable by the search engine. However, it should be appreciated that a search engine is merely one example of an application in which the various aspects described herein can be implemented and that, unless explicitly stated otherwise, the hereto appended claims are not intended to be limited to such an application.

In accordance with one aspect, system 100 can utilize multiple indexes 130 to represent overlapping and/or non-overlapping sets of resources utilized by system 100 in order to balance a trade-off between accuracy and speed for operations over a large set of resources. By way of example, such a multiple index system can be utilized for search engines that serve the World Wide Web (the “Web”). It can be appreciated that the number of available pages on the Web is exploding. For example, various reports indicate that there are between 120 billion and 1 trillion unique URLs on the Web, and it is expected that this number will continue to rapidly increase in the future. As a consequence, it can be prohibitively difficult for a search engine to maintain a single, high-speed index for all web pages. Accordingly, many existing search engines utilize an architecture with multiple indexes 130 such as that illustrated by system 100. These indexes 130 can include, for example, a smaller index 130 that can be accessed at a relatively high speed, and/or a larger index 130 that is accessed at a lower speed. Accordingly, in the example of a search engine, head URLs (e.g., URLs queried more frequently by users of the search engine) can be placed into the smaller index 130, while tail URLs (e.g., URLs queried less frequently by users of the search engine) can be placed into the larger index 130.

In an example implementation such as the multi-index search engine described above, techniques can be utilized to manage a trade-off between the high speed of a smaller index and the information volume of a larger index. For example, due to the slower speed of the larger index and the fact that a high query volume may cause the larger index to become overloaded, a search engine generally cannot feed all queries to the larger index. However, a search engine may cause user dissatisfaction if a most desirable URL for a user’s query is located in the larger index but the larger index is skipped by the search engine. Accordingly, a portion of queries can be selected to be provided to the larger index (or both the smaller index and the larger index), while the remaining queries can skip the larger index and be provided only to the smaller index. In one example, in order to maximize query processing speed, the portion of queries selected to be provided to the larger index can be relatively small as compared to the portion of queries that are provided to the smaller index only.

Conventional techniques for classifying queries into those for which a larger index is to be processed and those for which the larger index is to be skipped generally rely on sets of rules that are manually written and applied. For example, one or more rules can be created and utilized that direct a query to a larger index if the query contains greater than a predetermined number of words, if the query contains a human name, or the like. However, as these rules are generally applied in a rigid fashion across the entire landscape of queries, use of these conventional techniques can result in sub-optimal query processing performance in some instances. Further, it can be appreciated that the lack of flexibility caused by rigid application to a set of rules can result in limited adaptability to changing conditions of the indexed resources.

In view of the above-described shortcomings of conventional query classification techniques, the query classifier component 120 in system 100 can utilize a machine learning-based approach to automatically predict whether a query 110 can be better answered using both a smaller index and a larger index or by using a smaller index only (e.g., and skipping a larger index). In one example, a set of URLs can be placed into respective indexes 130 in system 100 based on the relative popularity of the respective URLs. For example, a set of URLs can be ranked according to their popularity using one or more web page ranking techniques that are generally known in the art. Based on this ranking, URLs with respective high rankings (e.g., head URLs) can be placed into a smaller, high-speed index 130, while URLs with respective low rankings (e.g., tail URLs) can be placed into a larger, low-speed index 130. Accordingly, system 100 can determine whether a larger index 130 is to be utilized for a query 110 by predicting whether the query 110 is aimed at a tail URL (e.g., a URL with a low ranking).

In one example, the query classifier component 120 can determine whether a given query 110 is aimed at a tail URL by utilizing a feature generation component 122 that identifies features of a query 110 that are related to the ranking(s) of the URL(s) that best match the query 110, a model building component 124 that generates and/or maintains a prediction model for respectively received queries based on a machine learning-based approach, a predicting component 126 that utilizes features extracted from a query 110 by the feature generation component 122 and a prediction model provided by the model building component 124 to predict whether the query 110 is aimed at a tail URL, and/or any other suitable component or combination of components. Operation of the query classifier component 120 as well as the feature generation component 122, model building component 124, and predicting component 126 is described in further detail infra. In accordance with one aspect, based on a prediction by the query classifier component 120 regarding whether a query 110 is aimed at a head URL or a tail URL, one or more indexes 130 can be utilized to answer the query 110. For example, a larger index and a smaller index can be utilized to answer a query predicted to be aimed at a tail URL, while the smaller index can be utilized without the larger index to answer a query predicted to be aimed at a head URL.

While the above description relates to a search engine that utilizes a plurality of indexes 130, it should be appreciated that system 100 and the query classifier component 120 can additionally and/or alternatively be utilized in the context of a single-index search engine. For example, a query 110 can be provided to the query classifier component 120, which can utilize a feature generation component 122, a model building component 124, and/or a predicting component 126 to predict whether the query is aimed at a head URL or a tail URL as generally described above. Based on this prediction, use of a single search index 130 associated with the search engine for processing the query can be controlled to optimize the efficiency of the search engine and its associated index 130. For example, various optimizations and other features of the search engine can be enabled or disabled for a given query 110 based on a prediction of whether the query 110 is aimed at a head URL or a tail URL. Additionally and/or alternatively, respective priorities of received queries 110 can be adjusted by system 100 such that, for example, queries 110 predicted to be targeted on tail URLs are favored over queries 110 predicted to be targeted on head URLs, or vice versa.

In accordance with one aspect, the query classifier component 120 can utilize one or more techniques based in artificial intelligence (AI), such as machine learning techniques or the like, to aid in classification of respective queries 110. As used in this description, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms (e.g., decision trees, neural networks, regression analysis, cluster analysis, genetic algorithm, and reinforced learning) to a set of available data (information) on the system. For example, the query classification component 120 can employ one or more of numerous methodologies for learning from data and then drawing inferences from the models so constructed, e.g. hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches (that perform data fusion, etc.) in accordance with implementing various automated aspects described hereinafter.

Figure 2:
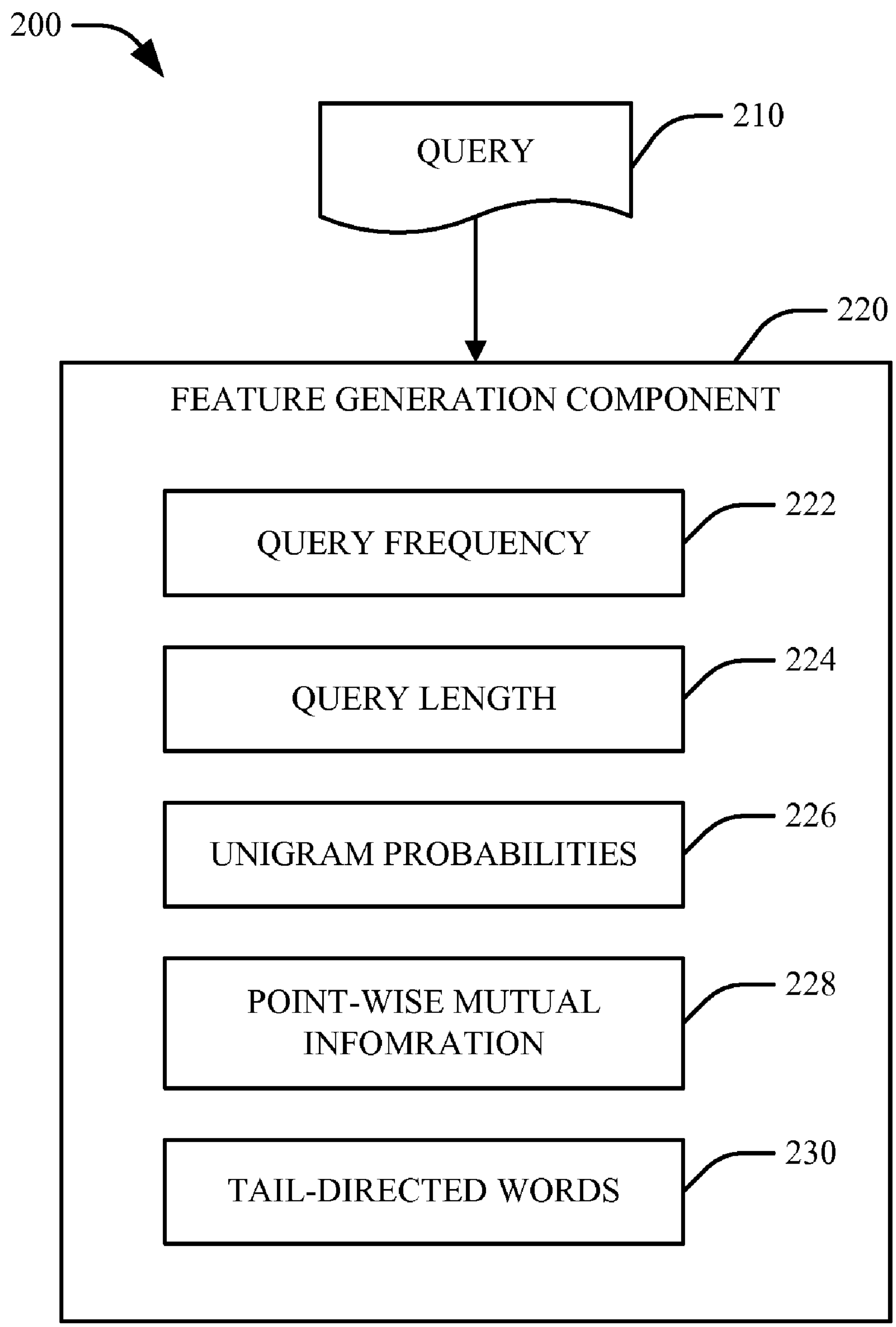
FIG. 2 is a block diagram of a system for generating features of a query in accordance with various aspects.

Turning now to FIG. 2, block diagram of a system 200 for generating features of a query 210 is illustrated. More particularly, system 200 illustrates that a query 210 can be provided to a feature generation component 220, which can determine one or more features of the query 220 including, for example, query frequency 222, query length 224, unigram probabilities 226 of words and/or phrases in the query 210, point-wise mutual information corresponding to respective groups of words in the query 210, presence or absence of predetermined tail-directed words 230 in the query 210, and/or other suitable features. In one example, features 222-230 and/or other features collected by the feature generation component 220 relative to a query 210 can relate to the ranking of one or more URLs that best match with the query 210, which in turn can relate to one or more indexes to be utilized in answering the query 210.

In accordance with one aspect, features 222-230 can be generated and/or utilized in one or more of the following manners. In one example, the feature generation component 220 can determine the query frequency 222 for a query 210 by determining the relative frequency with which the query 210 and/or words or phrases in the query appear in relation to all queries received by the feature generation component 220. In accordance with one aspect, it can be observed that more frequent queries are less likely to be directed to tail URLs due to the fact that frequent queries are more likely to relate to popularly-accessed resources, which are more likely to be associated with a smaller index. Accordingly, a query 210 with a high query frequency 222 can be made more likely to skip a larger index associated with system 200.

In another example, query length 224 can be determined for a given query 210 by counting the number of words and/or characters present in the query 210. In accordance with one aspect, the determined query length 224 for a particular query 210 can subsequently be utilized in various manners. By way of specific example, the number of words present in a query 210 can be utilized to modify the manner in which other features 222-230 are handled in classifying the query 210. For example, it can be observed that the average frequency of a query can vary depending on the number of words in the query. Accordingly, the number of words identified in a given query 210 can be combined with the query frequency 222 of the query 210 in the model created by the model building component 124 to indicate whether the query 210 is more likely to be aimed at a tail URL. In another example, the query length 224 determined for a particular query 210 in terms of words or characters can be directly utilized in a determination of whether the query 210 is directed at a tail URL. For example, the feature generation component 220 can regard queries 210 having a larger query length 224 to be more likely to be aimed at a tail URL.

In a third example, unigram probabilities 226 can be determined for respective words and/or phrases in a query 210. In accordance with one aspect, a unigram probability 226 for a given word in a query 210 can be computed as the likelihood that the word will appear in a document or query based on the frequency with which the word appears in respective documents indexed by system 200 and/or respective web queries 210 previously provided to system 200. Accordingly, a query 210 containing terms with high unigram probabilities 226 can be determined to be more likely to be aimed at a head URL, while queries 210 containing terms with low unigram probabilities 226 can be determined to be more likely to be aimed at a tail URL. In one example, unigram probabilities for respective words and/or phrases with respect to a document set or a log of previously submitted queries can be pre-computed and stored at a look-up table (not shown) and/or a similar structure within system 200.

In accordance with one aspect, based on unigram probabilities 226 for respective words and/or phrases in a given query 210, one or more functions can be performed to obtain an aggregation of unigram probabilities 226 that is representative of the query 210 as a whole, which can subsequently be utilized in selecting indexes to be utilized for responding to the query 210. For example, the feature generation component 220 can utilize the maximum, minimum, geometric average, and/or any other aggregation function of the unigram probabilities 226 of the words in the query 210 to obtain a representative probability feature. In accordance with another aspect, in the event that there are large differences between the unigram probabilities 226 of respective search terms, the feature generation component 220 can utilize logarithms of the unigram probabilities 226 rather than the probabilities themselves to enable better use of the probabilities during classification.

In a fourth example, the feature generation component 220 can generate point-wise mutual information 228 for a given query 210 by determining the likelihood that respective groups of words in a query will appear together in a document and/or query. By way of specific example, point-wise mutual information 228 can correspond to respective probabilities that groups of two consecutive words in a query 210 will appear together in a document indexed by system 200. Thus, for example, if a query 210 contains the phrase "coffee desk," point-wise mutual information 228 for the query 210 can indicate that the query is likely to be directed to a tail URL, even if both the terms "coffee" and "desk" are determined to have high unigram probabilities 226, if it is further determined that said terms seldom appear together. It should be appreciated, however, that the above example is non-limiting and that point-wise mutual information 228 can correspond to groups of any suitable number of consecutive or non-consecutive terms in a query 210. In accordance with one aspect, point-wise mutual information 228 for a group of terms in a query 210 can be determined by comparing the unigram probabilities 226 of each of the terms in the group to the probability of all terms in the group. For example, in the example case of a group of two terms x and y, point-wise mutual information 228 can be determined by $p(x)\cdot p(y)/p(x, y)$, where $p(x)$ and $p(y)$ are the unigram probabilities 226 of x and y, respectively, and $p(x, y)$ is the combined probability of x and y. In another example, representative point-wise mutual information 228 can be generated for a query 210 in a similar manner to that described above with respect to unigram probabilities 226 by computing the maximum, minimum, arithmetic average, geometric average, and/or another suitable function of point-wise mutual information 228 corresponding to respective groups of terms in the query 210.

In a fifth example illustrated by system 200, the feature generation component 220 can attempt to identify one or more tail-directed words 230 in a query 210, which can then be utilized in determining whether the query 210 is likely to be targeted at a tail URL. In one example, tail-directed words 230 can be defined as a predetermined set of words for which a query 210 containing one or more of said words is more likely to be aimed at a tail URL. Additionally and/or alternatively, tail-directed words 230 can be found and/or set by an automatic process.

Figure 3:
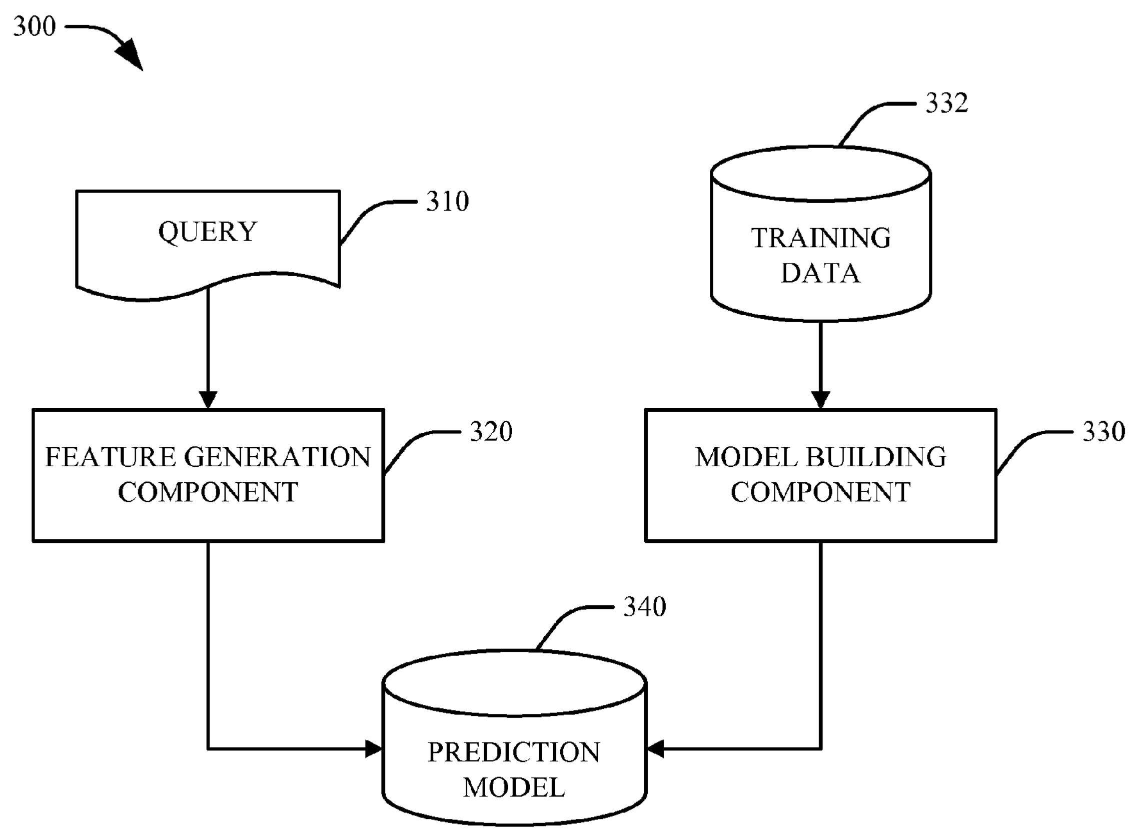
FIG. 3 is a block diagram of a system for building a prediction model for query classification in accordance with various aspects.

Turning now to FIG. 3, a block diagram of a system 300 for building a prediction model 340 for query classification in accordance with various aspects is illustrated. As FIG. 3 illustrates, upon receipt of a query 310, the query 310 can be provided to a feature generation component 320 to generate one or more features corresponding to the query as generally provided above in the description relating to system 200. As further illustrated in system 300, query features generated by the feature generation component 310 can then be provided to a prediction model 340, which can be utilized to identify one or more indexes (not shown) that are best suited for handling the query 310.

In accordance with one aspect, the prediction model 340 can be constructed using a model building component 330, which can operate based on one or more machine learning algorithms to construct the prediction model 340 based at least in part on a set of training data 332 provided to the model building component 330. Machine learning techniques that can be utilized by the model building component 330 in constructing a prediction model 340 can include, but are not limited to, a neural network, decision tree learning, a support vector machine (e.g., based on linear regression and/or any other suitable technique), case-based reasoning, and/or any other suitable machine learning algorithm.

Figure 4:
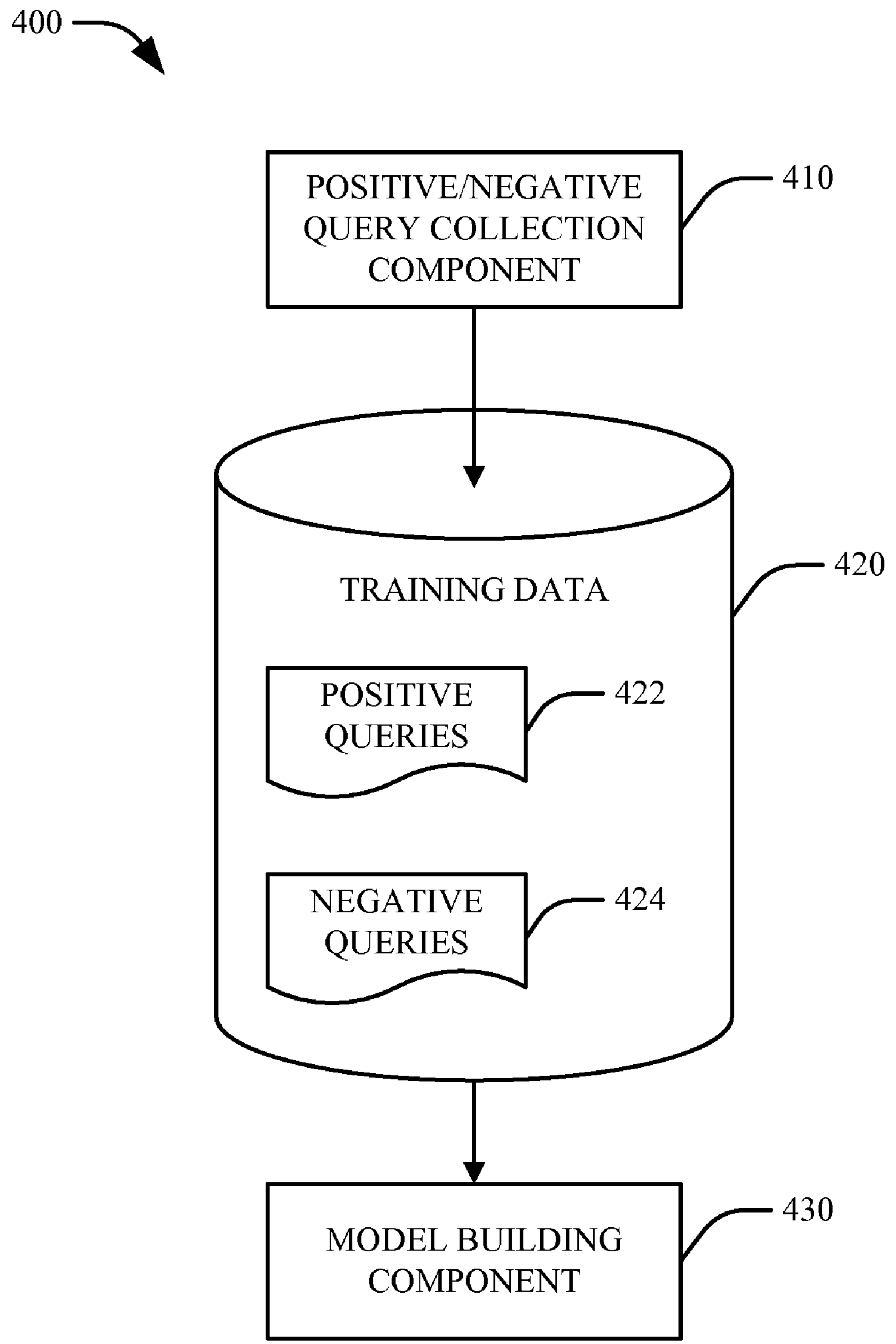
FIG. 4 is a block diagram of a system for collecting and utilizing diagnostic training data to build a query prediction model in accordance with various aspects.

Referring now to FIG. 4, a system 400 for collecting and utilizing training data 420 to build a query prediction model in accordance with various aspects is illustrated. In accordance with one aspect, a model building component 430 that constructs a query prediction model based on machine learning can utilize training data 420 in the form of a set of positive queries 422 (e.g. queries found to be aimed at tail URLs) and/or a set of negative queries 424 (e.g., queries found not to be aimed at tail URLs). In one example, the model building component 420 can obtain data relating to positive queries 422 and/or negative queries 424 from a positive/negative query collection component 410.

By way of specific, non-limiting example, the positive/negative query collection component 410 can implement the functionality of an automatic query diagnostic system. More particularly, the automatic diagnostic system can identify respective query-URL pairs for which the URL in a pair is the desired result for its corresponding query. Among these query-URL pairs, queries for which the corresponding URL is located in a larger index can be provided as positive queries 422, while queries for which the corresponding URL is instead provided in a smaller index can be provided as negative queries 424. Thus, stated another way, positive queries 422 can be queries identified by the positive/negative query collection component 410 that were to be answered using both a larger index and a smaller index, while negative queries 424 can be queries identified by the positive/negative query collection component 410 that were to be answered using the smaller index alone.

In accordance with one aspect, positive queries 422 and/or negative queries 424 in system 400 can initially be processed to obtain features relating to the respective queries (e.g., by a feature generation component 220 as illustrated by FIG. 2 and/or any other suitable component or combination thereof). Subsequently, given the positive and/or negative queries 422-424 and their features, a prediction model can be built by the model building component 430 using one or more machine learning techniques. The prediction model can then be applied as illustrated by FIG. 3 for a new query to obtain an output regarding whether the query aims at a tail URL.

Figure 5:
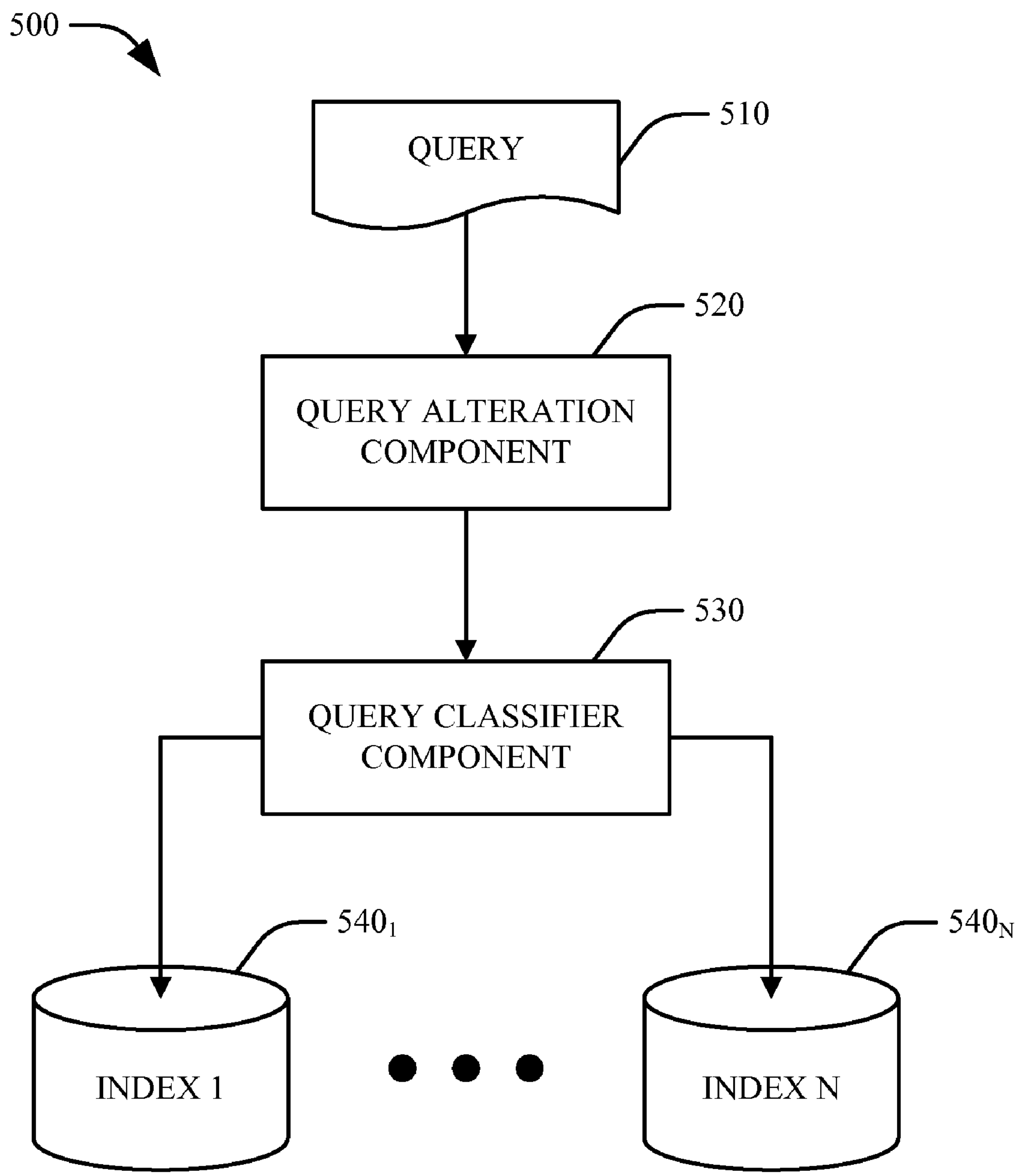
FIG. 5 is a block diagram of a system for processing and classifying a query in accordance with various aspects.

Turning next to FIG. 5, a system 500 for processing and classifying a query 510 in accordance with various aspects is illustrated. In one example, upon receiving a query 510, the query can be optionally processed by a query alteration component 520, after which the query 510 can be classified as a head-URL-directed query or a tail-URL-directed query by a query classifier component 530. Based on the classification, one or more indexes 540 can be assigned for processing of the query 510. In accordance with one aspect, the query classifier component 530 can operate in various manners as provided in the above description. In accordance with another aspect, the query alteration component 520 can perform one or more modifications for a received query 510 prior to processing by the query classifier component 530. These operations can include, but are not limited to, spelling correction and/or alteration, expansion of one or more words present in a query 510, addition of related words and/or phrases to a query 510, or the like.

Figure 6:
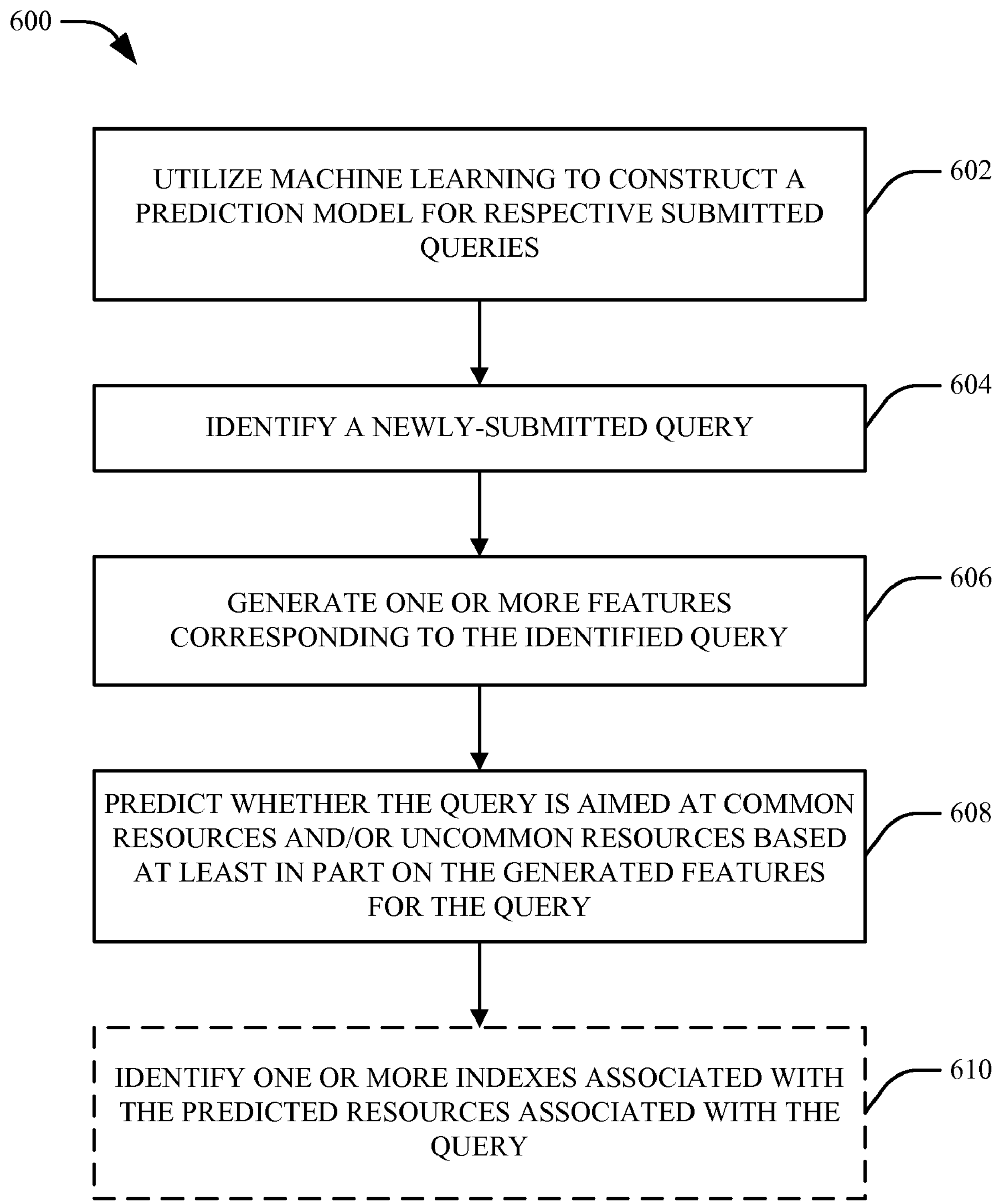
FIG. 6 is a flowchart of a method for directing a query to one or more appropriate indexes based on a machine learning classification.
Figure 7:
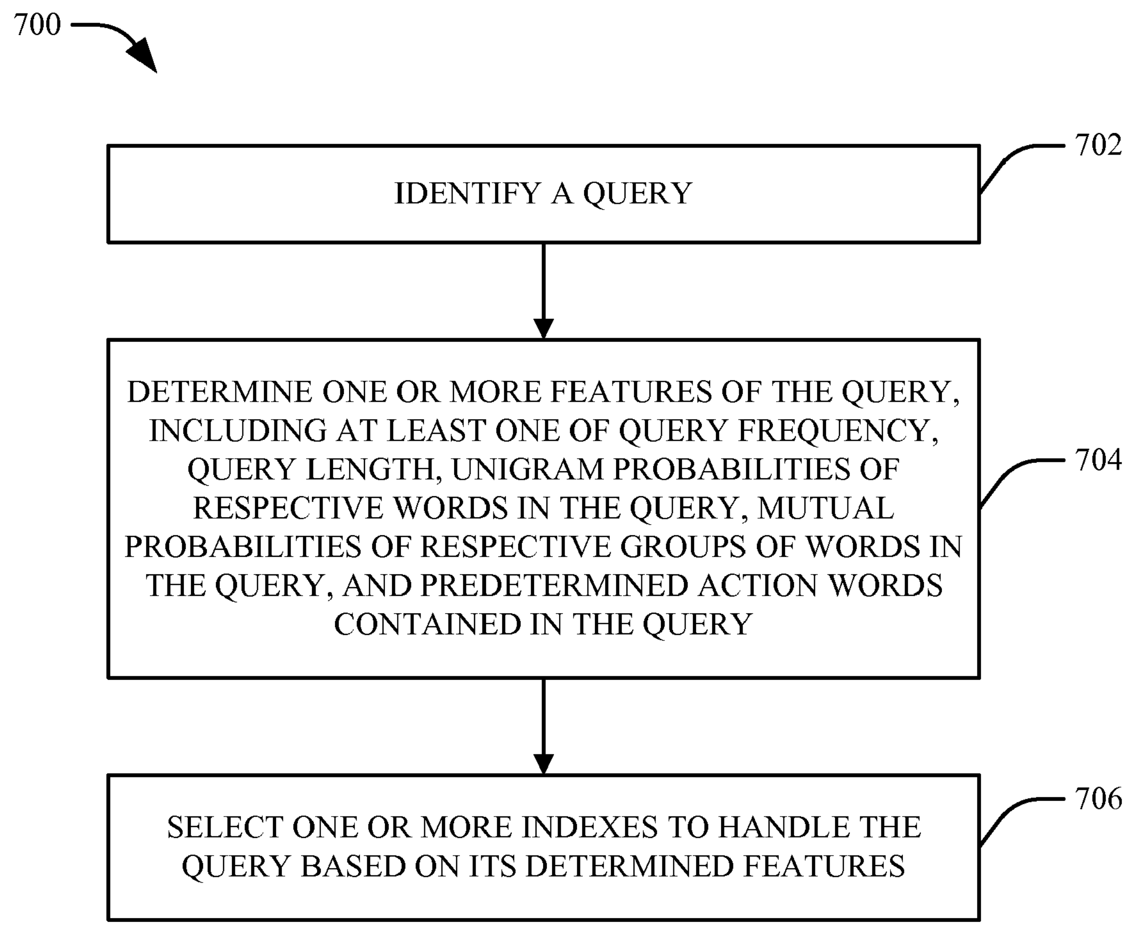
FIG. 7 is a flowchart of a method for handling a query based on identified features of the query.
Figure 8:
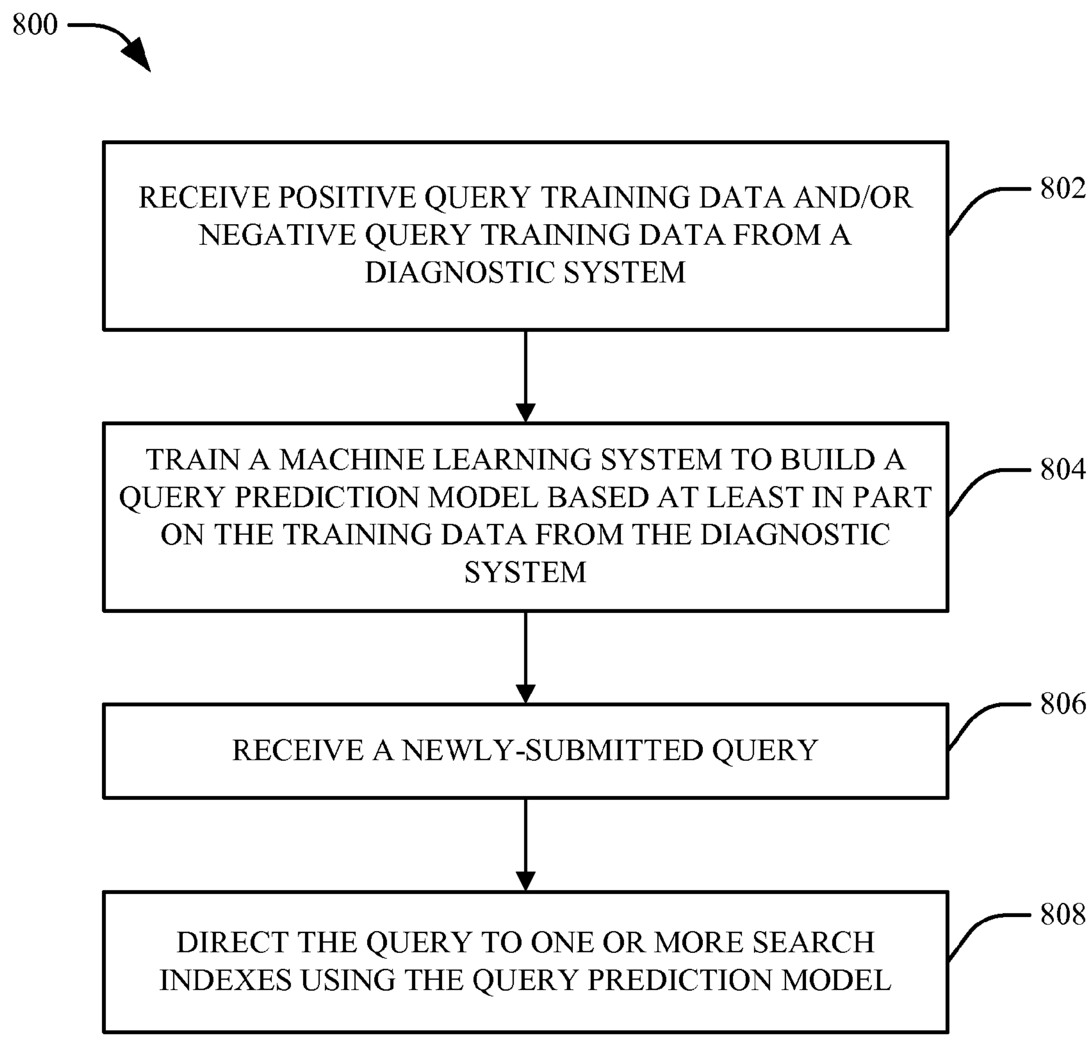
FIG. 8 is a flowchart of a method for constructing a query prediction model from diagnostic training data and processing a query based on the query prediction model.

Turning to FIGS. 6-8, methodologies that may be implemented in accordance with various features presented herein are illustrated via respective series of acts. It is to be appreciated that the methodologies claimed herein are not limited by the order of acts, as some acts may occur in different orders, or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as claimed herein.

Referring to FIG. 6, a method 600 of directing a query (e.g. a query 110) to one or more appropriate indexes (e.g., indexes 130) based on a machine learning classification is illustrated. At 602, machine learning is utilized (e.g. by a model building component 124 at a query classifier component 120) to construct a prediction model (e.g., a prediction model 340) for respective submitted queries. At 604, a newly-submitted query is identified. At 606, one or more features corresponding to the query identified at 604 are generated (e.g., by a feature generation component 122). At 608, it is predicted whether the query identified at 604 is aimed at common resources (e.g., head URLs) and/or uncommon resources (e.g., tail URLs) based at least in part on the features corresponding to the query generated at 606.

Method 600 can then optionally proceed to 610, wherein one or more indexes associated with the resources associated with the query as predicted at 608 are identified. In one example, one or more indexes predicted at 610 can subsequently be utilized to process the query received at 604. For example, in an implementation having a large search index and a small search index, a query can be answered using the small index only if the small index is predicted at 610 or by both the large index and the small index if the large index is predicted at 610.

In accordance with one aspect, an entity performing method 600 can, as an alternative to the index identification at 610, assign one or more optimizations, priority levels, and/or any other suitable controls for subsequent processing of the query identified at 604 following the prediction at 608. This can be utilized, for example, in a single-index search engine to enable queries targeted at common resources to be processed in a different manner than queries targeted at uncommon resources.

Referring now to FIG. 7, a flowchart of a method 700 for handling a query (e.g., a query 210) based on identified features of the query is provided. At 702, a query is identified. At 704, one or more features of the query identified at 702 are determined (e.g., by a feature generation component 220). The features determined at 704 can include query frequency (e.g. query frequency 222), query length (e.g., query length 224), unigram probabilities of respective words in the query identified at 702 (e.g., unigram probabilities 226), mutual probabilities of respective groups of words in the query identified at 702 (e.g., point-wise mutual information 228), and/or predetermined action words (e.g., tail-directed words 230) contained in the query identified at 702. At 706, one or more indexes are selected to handle the query identified at 702 based on the features determined at 704.

FIG. 8 illustrates a method 800 for constructing a query prediction model (e.g., a prediction model 340) from diagnostic training data (e.g., training data 332 and/or 420) and processing a query (e.g., a query 310) based on the query prediction model. At 802, positive query training data (e.g. positive queries 422) and/or negative query training data (e.g., negative queries 424) are received from a diagnostic system (e.g. a positive/negative query collection component 410). At 804, a machine learning system (e.g., model building component 330 and/or 430) is trained to build a query prediction model based at least in part on the training data received at 802. At 806, a newly-submitted query is received. At 808, the query received at 806 is directed to one or more search indexes using the query prediction model built at 804.

Figure 9:
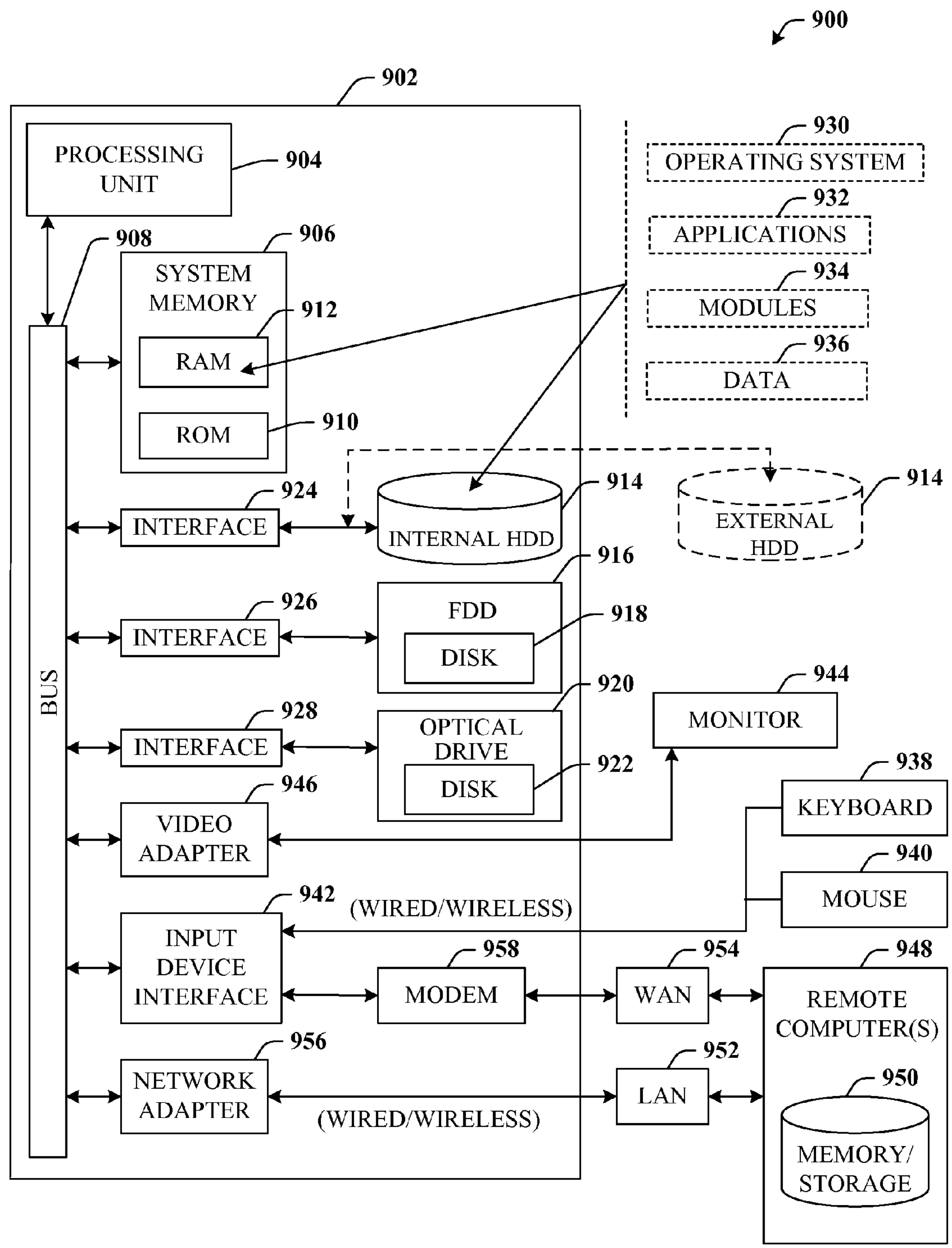
FIG. 9 is a block diagram of a computing system in which various aspects described herein can function.

In order to provide additional context for various aspects described herein, FIG. 9 and the following discussion are intended to provide a brief, general description of a suitable computing environment 900 in which various aspects of the claimed subject matter can be implemented. Additionally, while the above features have been described above in the general context of computer-executable instructions that may run on one or more computers, those skilled in the art will recognize that said features can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, an exemplary environment 900 for implementing various aspects described herein includes a computer 902, the computer 902 including a processing unit 904, a system memory 906 and a system bus 908. The system bus 908 couples to system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g. EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the claimed subject matter can be implemented with various commercially available operating systems or combinations of operating systems.

A user can enter commands and information into the computer 902 through one or more wired/wireless input devices, e.g. a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, a serial port, an IEEE-1394 port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 13 Mbps (802.11a) or 54 Mbps (802.11b) data rate, for example, or with products that contain both bands (dual band). Thus, networks using Wi-Fi wireless technology can provide real-world performance similar to a 10 BaseT wired Ethernet network.

Figure 10:
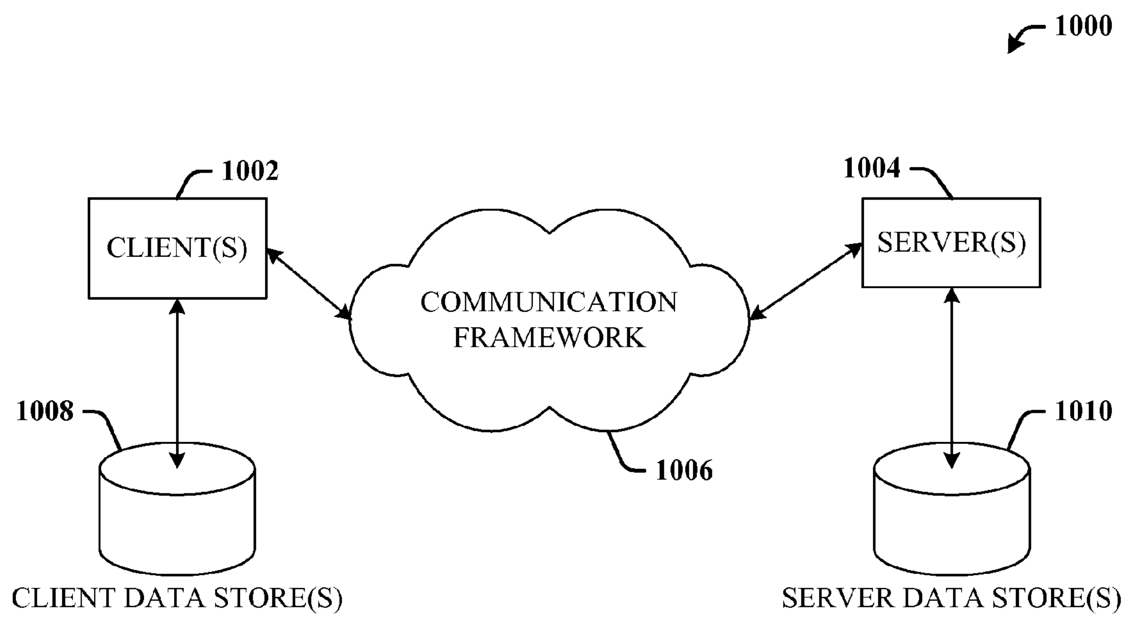
FIG. 10 illustrates a schematic block diagram of an example networked computing environment.

Referring now to FIG. 10, there is illustrated a schematic block diagram of an exemplary computer compilation system operable to execute the disclosed architecture. The system 1000 includes one or more client(s) 1002. The client(s) 1002 can be hardware and/or software (e.g. threads, processes, computing devices). In one example, the client(s) 1002 can house cookie(s) and/or associated contextual information by employing one or more features described herein.

The system 1000 also includes one or more server(s) 1004. The server(s) 1004 can also be hardware and/or software (e.g., threads, processes, computing devices). In one example, the servers 1004 can house threads to perform transformations by employing one or more features described herein. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g. a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the described aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for classifying a query in relation to one or more indexes to which the query is to be directed, comprising:
- one or more computer memories that store data relating to at least one index; and
- at least one processor coupled to the one or more computer memories, the at least one processor being configured to act as:
- a feature generation component that generates one or more features corresponding to the query;
- a model building component that builds a prediction model for respective queries by utilizing a machine learning algorithm and a set of training data; and
- a predicting component that:
  - analyzes the one or more features corresponding to the query and the prediction model, and
  - predicts, based at least on the analyzing, whether the query is directed to a resource pre-designated as a commonly queried resource or a resource pre-designated as an uncommonly queried resource.

2. The system of claim 1, wherein the one or more features corresponding to the query comprise frequency with which the query is received.

3. The system of claim 1, wherein the one or more features corresponding to the query comprise length of the query in one or more of characters or words.

4. The system of claim 1, wherein the one or more features corresponding to the query comprise unigram probabilities of respective words or phrases in the query, the unigram probabilities being computed based on at least a frequency with which the respective words or phrases in the query appear in at least one of a set of indexed resources or a set of previously received queries.

5. The system of claim 4, wherein the feature generation component computes at least one representative unigram probability for the query as a logarithm of at least one of a maximum unigram probability, a minimum unigram probability, or an average unigram probability generated for respective words or phrases in the query.

6. The system of claim 1, wherein the one or more features corresponding to the query comprise point-wise mutual information corresponding to respective probabilities that respective groups of consecutive words in the query appear together in indexed resources.

7. The system of claim 6, wherein the feature generation component computes at least one representative set of maximum, minimum, or average point-wise mutual information inferred from probabilities that respective groups of consecutive words in the query appear together in indexed resources.

8. The system of claim 1, wherein the one or more features corresponding to the query comprise information relating to presence of one or more words in the query that are defined as associated with resources pre-designated as uncommonly queried resources.

9. The system of claim 1, wherein the at least one processor is further configured to act as a positive/negative query collection component that collects positive query training data comprising queries aimed at resources pre-designated as uncommonly queried resources and negative query training data comprising queries aimed at resources pre-designated as commonly queried resources.

10. The system of claim 9, wherein:

the feature generation component further generates at least one feature corresponding to each of the queries included in the positive query training data and the negative query training data; and the model building component further builds the query prediction model by utilizing the at least one feature and the resources to which the queries are directed as at least a portion of the training data.

11. The system of claim 1, wherein:

the at least one index comprises a first index having an associated first speed and first capacity, and a second index having an associated second speed that is slower than the first speed and a second capacity that is larger than the first capacity; and the predicting component further associates queries predicted to be directed to resources pre-designated as commonly queried resources with the first index and associates queries predicted to be directed to resources pre-designated as uncommonly queried resources with the second index.

12. The system of claim 1, wherein the predicting component further applies one or more of a first priority level or a first optimization level to queries predicted to be directed to resources pre-designated as commonly queried resources and applies one or more of a second priority level or a second optimization level to queries predicted to be directed to resources pre-designated as uncommonly queried resources, the second priority level and the second optimization level being respectively disparate from the first priority level and the first optimization level.

13. A method of classifying and answering a query, comprising:

employing one or more processors to perform the classifying and answering, the classifying and answering comprising:

creating a prediction model for respective queries based on a set of diagnostic data using one or more machine learning algorithms, the set of diagnostic data comprising respective pairs of one query and an identity of an indexed resource to which the one query is directed;

identifying the query;

generating one or more features corresponding to the query; and predicting whether the query is directed to a commonly queried resource or an uncommonly queried resource by analyzing the one or more features corresponding to the query and the prediction model.

14. The method of claim 13, wherein the generating comprises determining the one or more features relating to frequency with which the query is received.

15. The method of claim 13, wherein the generating comprises determining the one or more features relating to a number of characters in the query or a number of words in the query.

16. The method of claim 13, wherein the generating comprises determining the one or more features relating to at least one of frequency with which respective words or phrases in the query appear in respective indexed resources or probability that respective groups of words in the query appear together in the respective indexed resources.

17. The method of claim 13, wherein the generating comprises determining the one or more features relating to presence of predetermined action words in the query that are designated as likely to be aimed at uncommonly queried resources.

18. The method of claim 13, wherein the creating a prediction model comprises collecting training data comprising positive query data including queries aimed at uncommonly queried resources, and negative query data including queries aimed at commonly queried resources.

19. The method of claim 18, wherein the creating a prediction model further comprises:

generating at least one feature corresponding to each of the queries included in the positive query data and the negative query data; and utilizing at least one of the at least one feature of the queries or identities of resources to which the queries are aimed as the training data in creating the prediction model.

20. A machine-readable storage medium having stored thereon instructions that, when executed by a machine, perform acts comprising:

obtaining a set of positive search data from an automatic diagnostic system, the set of positive search data comprising one or more queries aimed at Uniform Resource Locators (URLs) indexed by a large search index;

obtaining a set of negative search data from the automatic diagnostic system, the set of negative search data comprising one or more queries aimed at respective URLs indexed by a small search index;

constructing a prediction model from the positive search data and the negative search data using a machine learning algorithm;

receiving a newly-submitted query;

obtaining one or more features of the newly-submitted query;

predicting whether the newly-submitted query is aimed at a URL indexed by the small index or a URL indexed by the large index, the predicting being based on the features of the newly-submitted query and the prediction model; and answering the newly-submitted query using the small index upon predicting that the newly-submitted query aims at a URL indexed by the small index, or using the large index upon predicting that the newly-submitted query aims at a URL indexed by the large index.

* * * * *